J. M. SEYMOUR, Jr.
SELF OILING BEARING.
APPLICATION FILED APR. 19, 1916.
1,227,082.
Patented May 22, 1917.
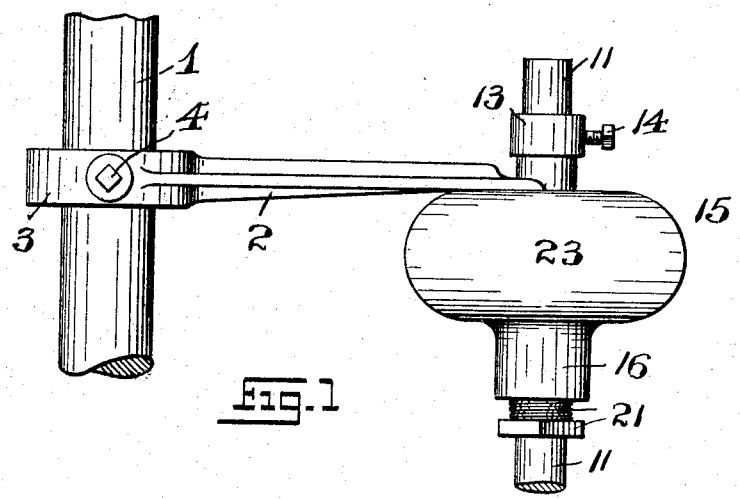
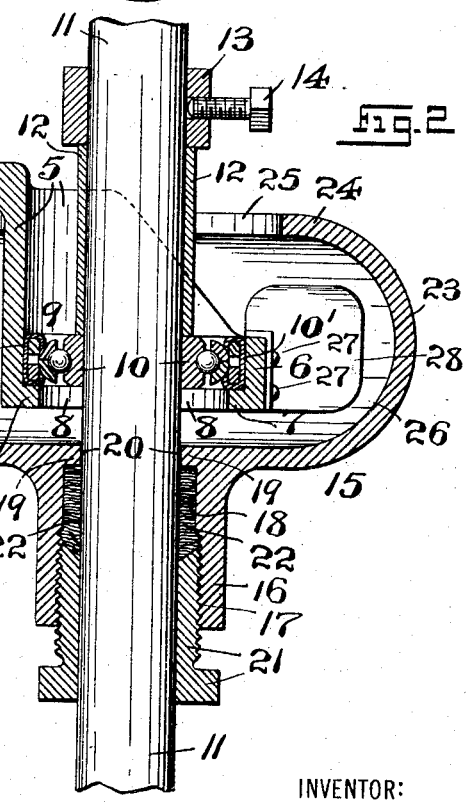
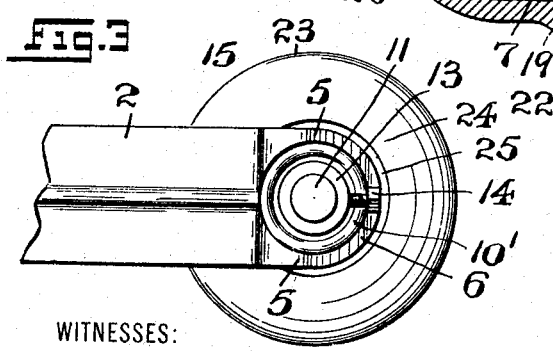
WITNESSES:
Fredk. H. W. Frantzel
Eva E. Desch
INVENTOR:
James M. Seymour Jr.
BY
Frantzel and Richards,
ATTORNEYS

UNITED STATES PATENT OFFICE.

JAMES M. SEYMOUR, JR., OF NEWARK, NEW JERSEY.

SELF-OILING BEARING.

1,227,082. Specification of Letters Patent. Patented May 22, 1917.

Application filed April 19, 1916. Serial No. 92,072.

*To all whom it may concern:*

Be it known that I, JAMES M. SEYMOUR, Jr., a citizen of the United States, residing at Newark, in the county of Essex and State of New Jersey, have invented certain new and useful Improvements in Self-Oiling Bearings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in self-oiling bearings; and, the present invention has reference, more particularly, to a novel self-oiling bearing for use with a vertical shaft, with a view of providing in connection with the bearing, an oil-container for constantly lubricating the shaft, without the danger of the lubricant or oil running down the shaft or leaking out of the oil-receptacle.

The present invention has for its further object to provide in connection with a shaft, a self-oiling bearing in which the stuffing box, the packing, and the oil-cup all revolve with the shaft, and in consequence of which, when the stuffing box is once made tight, it remains tight, and any damage by dripping oil is entirely obviated.

While it may be true, that vertical shaft-bearings have been made with the shaft running in and through a stuffing box attached to a hanger, and that for a short time such bearings will remain tight, it is a fact that the inevitable wear on the packing caused by the shaft revolving in the stuffing box, makes their life short, and oil-leakage soon takes place, it being quite impossible to keep a stuffing box tight with a shaft revolving in it, unless constantly followed up.

The invention has for its further purpose to provide an oil-cup or container of the general cup-shape or configuration represented in the accompanying drawings, which precludes the throwing out of the oil due to centrifugal force, and the greater the speed of the shaft, the more the oil tends to lay in the form of an annular ring at the farthest point in the oil cup from the center of rotation.

Other objects of the present invention not at this time more particularly enumerated will be clearly understood from the following detailed description of the present invention.

With the various objects of the present invention in view, the invention consists, primarily, in the novel self-oiling bearing hereinafter set forth; and, the invention consists, furthermore, in the novel arrangements and combinations of the several devices and parts, all of which will be more fully described in the following specification, and then finally embodied in the clauses of the claim which are appended to and which form an essential part of the said specification.

The invention is clearly illustrated in the accompanying drawings, in which:—

Figure 1 is a side elevation of a fragmentary portion of a vertical shaft, a fixed bracket or hanger, and a self-oiling bearing employed with the said shaft and the said bracket or hanger, illustrating one embodiment of the principles of the present invention; Fig. 2 is an enlarged vertical sectional representation of a portion of the said bracket or hanger, and the self-oiling bearing, with the shaft represented in elevation; and Fig. 3 is a top view of a portion of the bracket or hanger, the self-oiling bearing, and the vertical shaft, said view being made on the same scale as the parts represented in said Fig. 1.

Similar characters of reference are employed in the said above described views, to indicate corresponding parts.

Referring now to the said drawings, the reference-character 1 indicates any suitable fixture, in this instance a rod or post, upon which is suitably mounted or secured a bracket or hanger carrying the self-oiling bearing which is made according to the principles of the present invention. The said bracket or hanger, as shown in the accompanying drawings, comprises a suitably shaped and laterally extending support or arm, as 2, provided upon its one end with a ring-shaped element or eye 3 adapted to be fitted upon the said fixture or rod 1, and suitably secured thereon in its supporting relation by means of a set-screw 4. Upon its other end-portion the said support or arm 2 is made with a downwardly extending arc-shaped member 5, formed at its lower portion with a ring-shaped supporting member, as 6.

This member 6, as will be seen from an inspection of Fig. 2 of the drawings, is made with an inwardly projecting annular seat, as 7, surrounding an opening 8. Mounted upon this seat is a ball or roller-bearing 9 of any suitable construction, comprising the members 10 and 10', the ring-shaped member 10 of the said bearing being suitably affixed upon the vertical shaft 11 so as to revolve with the latter, as will be clearly evident. Mounted upon the said shaft 11, with its lower end resting upon the upper surface of said ring-shaped member 10, is a suitable sleeve, as 12, and also mounted upon said shaft 11, directly above the upper end-portion of said sleeve 12 is a supporting ring or collar 13, which is securely affixed to the said shaft by means of a set-screw 14. In this manner, as will be clearly evident, the shaft 11 and the ball or roller-bearing are operatively mounted with relation to the supporting element of the bracket or hanger, and any displacement of the shaft in a downward direction is clearly obviated.

Suitably mounted upon the shaft 11, at a desirable point below the member 6 and the ball or roller-bearing 9, is the neck or sleeve-like portion 16 of a suitably-shaped oil or lubricant container, as 15. The said neck or sleeve-like portion 16 is internally screw-threaded, as at 17, its upper chambered part 18 being closed by a wall-portion 19 in which there is an opening 20 into and through which the shaft 11 extends, as shown. Screwed into the lower screw-threaded portion of the said neck 16 is a gland, as 21, and in the said chambered part 18, between the wall-portion 19 and the end of the gland 21, and surrounding the shaft 11 is a packing 22, the whole forming a suitable stuffing box, rotating with the shaft, and thus remaining tight upon the shaft, so that all dripping of the lubricant from the stuffing box, or the oil running down the shaft is entirely obviated, after the stuffing box has once been made tight, as will be clearly evident from an inspection of Fig. 2 of the drawings.

The upper part of the said neck or sleeve-like portion 16 is made with an enlarged hollow ball or cup-shaped element, as 23, the upper portion of which extends annularly and inwardly, as at 24, and has an opening, as 25, into and down which the arc-shaped member 5 of the bracket or hanger projects and extends into the interior or chamber 26 of the said ball or cup-shaped element 23, the previously-mentioned seat 7 of the ring-shaped member 6 connected with said member 5, and the ball or roller-bearing being also disposed within the interior or chamber 26 of the said ball or cup-shaped element 23, as illustrated in said Fig. 3.

If desired, there may be suitably secured to the non-rotating arc-shaped member 5, by means of screws 27, or in any other suitable manner, a suitably-shaped scoop or deflector, as 28, which, during the rotations of the shaft 11 and of the said ball or cup-shaped element 23, scoops up the oil or lubricant and deflects and conducts the same toward the center of the bearing where it floods the bearing and then runs through the bearing back into the rotating cup, to be again scooped up and deflected and deposited upon the central journal or bearing, as will be fully understood.

When at rest, the cup is filled with the lubricant or oil to a level slightly above the ball or roller-bearing, the annular and inwardly projecting portion 24 of the ball or cup-shaped element clearly preventing any spilling or flying of the oil or lubricant out of the opening 25.

Any further description of the operation of the self-lubricating bearing is deemed unnecessary, the same being fully understood from an inspection of said Fig. 3 of the drawings.

I am aware that some changes may be made in the general arrangements and combinations of the various devices and parts, without departing from the scope of the present invention as set forth in the foregoing specification and as defined in the clauses of the claim which are appended to the said specification. Hence, I do not limit my present invention to the exact arrangements and combinations of the various devices and parts as described in the said specification, nor do I confine myself to the exact details of the construction of the said parts as illustrated in the accompanying drawings.

I claim:—

1. In a self-oiling bearing, in combination with a shaft, a hanger, a bearing comprising movably related members, one of said members being connected with and supported upon a portion of said hanger and the other member being fixed upon and rotating with said shaft, and a container adapted to receive a lubricant into which a portion of said hanger projects and in which the said bearing is disposed and is completely immersed in the lubricant, said container being also fixed upon and rotating with said shaft.

2. In a self-oiling bearing, in combination with a shaft, a hanger, a bearing comprising movably related members, one of said members being connected with and supported upon a portion of said hanger and the other member being fixed upon and rotating with said shaft, and a container adapted to receive a lubricant into which a portion of said hanger projects and in which the said bearing is disposed, and is completely immersed in the lubricant, said container being also fixed upon said shaft, and a stuffing box connected with said container and also mounted upon said shaft, said container and stuffing box rotating with said shaft.

3. In a self-oiling bearing, in combination with a shaft, a hanger, a bearing comprising movably related members, one of said members being connected with and supported upon a portion of said hanger and the other member being fixed upon and rotating with said shaft, and a container adapted to receive a lubricant into which a portion of said hanger projects and in which the said bearing is disposed, and is completely immersed in the lubricant, said container being also fixed upon and rotating with said shaft, and an oil or lubricant-deflecting element within said container and connected with and extending from said hanger-portion within said container.

4. In a self-oiling bearing, in combination with a shaft, a hanger, a bearing comprising movably related members, one of said members being connected with and supported upon a portion of said hanger and the other member being fixed upon and rotating with said shaft, and a container adapted to receive a lubricant into which a portion of said hanger projects and in which the said bearing is disposed, and is completely immersed in the lubricant, said container being also fixed upon said shaft, and a stuffing box connected with said container and also mounted upon said shaft, said container and stuffing box rotating with said shaft, and an oil or lubricant-deflecting element within said container and connected with and extending from said hanger-portion within said container.

5. In a self-oiling bearing, in combination with a shaft, a hanger comprising a laterally extending supporting arm, a downwardly extending arc-shaped member, and a ring-shaped supporting member provided with a seat, a ball-bearing upon said seat, said bearing comprising movably related members, one of the members of the bearing being connected with and supported upon a portion of said shaft, and an oil or lubricant-container into which the said downwardly extending arc-shaped member of the hanger projects and in which the said ring-shaped member and the ball-bearing are arranged, said container being fixed upon and rotating with said shaft.

6. In a self-oiling bearing, in combination with a shaft, a hanger comprising a laterally extending supporting arm, a downwardly extending arc-shaped member, and a ring-shaped supporting member provided with a seat, a ball-bearing upon said seat, said bearing comprising movably related members, one of the members of the bearing being connected with and supported upon a portion of said shaft, and an oil or lubricant-container into which the said downwardly extending arc-shaped member of the hanger projects and in which the said ring-shaped member and the ball-bearing are arranged, said container being fixed upon said shaft, and a stuffing box connected with said container and also fixed upon said shaft, said container and stuffing box rotating with said shaft.

7. In a self-oiling bearing, in combination with a shaft, a hanger comprising a laterally extending supporting arm, a downwardly extending arc-shaped member, and a ring-shaped supporting member provided with a seat, a ball-bearing upon said seat, said bearing comprising movably related members, one of the members of the bearing being connected with and supported upon a portion of said shaft, and an oil or lubricant-container into which the said downwardly extending arc-shaped member of the hanger projects and in which the said ring-shaped member and the ball-bearing are arranged, said container being fixed upon and rotating with said shaft, and an oil or lubricant-deflecting element within said container and connected with and extending from the said downwardly projecting arc-shaped member of the hanger.

8. In a self-oiling bearing, in combination with a shaft, a hanger comprising a laterally extending supporting arm, a downwardly extending arc-shaped member, and a ring-shaped supporting member provided with a seat, a ball-bearing upon said seat, said bearing comprising movably related members, one of the members of the bearing being connected with and supported upon a portion of said shaft, and an oil or lubricant-container into which the said downwardly extending arc-shaped member of the hanger projects and in which the said ring-shaped member and the ball-bearing are arranged, said container being fixed upon said shaft, and a stuffing box connected with said container and also fixed upon said shaft, said container and stuffing box rotating with said shaft, and an oil or lubricant-deflecting element within said container and connected with and extending from the said downwardly projecting arc-shaped member of the hanger.

In testimony that I claim the invention set forth above I have hereunto set my hand this 14th day of April, 1916.

JAMES M. SEYMOUR, Jr.

Witnesses:
  FREDK. FRAENTZEL,
  FREDK. M. W. FRAENTZEL.